(12) United States Patent
Sahiner et al.

(10) Patent No.: US 11,331,835 B2
(45) Date of Patent: May 17, 2022

(54) MOUNTING ELEMENT, MOUNTING SET, METHOD FOR MOUNTING, AND COMPONENT

(71) Applicant: Robert Bosch GmbH, Stuttgart (DE)

(72) Inventors: Onur Sahiner, Bamberg (DE); Lars Wittko, Bamberg (DE); Ralph Ittlinger, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/633,476

(22) PCT Filed: Jun. 11, 2018

(86) PCT No.: PCT/EP2018/065310
§ 371 (c)(1),
(2) Date: Jan. 23, 2020

(87) PCT Pub. No.: WO2019/020257
PCT Pub. Date: Jan. 31, 2019

(65) Prior Publication Data
US 2020/0156294 A1 May 21, 2020

(30) Foreign Application Priority Data
Jul. 27, 2017 (DE) .......................... 102017212971.9

(51) Int. Cl.
*B29C 45/14* (2006.01)
*H01R 43/24* (2006.01)
(Continued)

(52) U.S. Cl.
CPC ........ *B29C 45/14065* (2013.01); *B29C 33/12* (2013.01); *B29C 33/126* (2013.01);
(Continued)

(58) Field of Classification Search
CPC ......... B29C 2045/14131; B29C 33/126; B29L 2031/3481
See application file for complete search history.

(56) References Cited

U.S. PATENT DOCUMENTS

| 5,507,089 A | 4/1996 | Dickmeyer |
| 5,944,262 A | 8/1999 | Akutagawa et al. |

(Continued)

FOREIGN PATENT DOCUMENTS

| CN | 102884684 A | 1/2013 |
| CN | 103154494 A | 6/2013 |

(Continued)

OTHER PUBLICATIONS

International Search Report for PCT/EP2018/065310, dated Oct. 1, 2018.

*Primary Examiner* — Atul P. Khare
(74) *Attorney, Agent, or Firm* — Norton Rose Fulbright US LLP; Gerard Messina

(57) ABSTRACT

A mounting element, i.e., a retaining element or clip, for mounting a terminal element at a component housing of a component body by extrusion-coating the component body at least in part with a coating material, which is designed (i) for holding and positioning a terminal element at a component housing of a component body while the component body is being extrusion-coated with a coating material, and (ii) for accommodating at least in part in the interior of a molding tool during the coating, (iii) which includes at least two support elements, and (iv) in which the at least two support elements are designed so that they are supported at an inner surface of the molding tool when the mounting element is held at the component housing of the component body while the component body and the mounting element are accommodated in the interior of the molding tool.

14 Claims, 7 Drawing Sheets

(51) Int. Cl.
  *G06F 1/18* (2006.01)
  *B29C 33/12* (2006.01)
  *B29L 31/36* (2006.01)
  *B29K 705/00* (2006.01)
  *B29L 31/34* (2006.01)

(52) U.S. Cl.
  CPC ............ *G06F 1/184* (2013.01); *H01R 43/24* (2013.01); *B29C 45/14336* (2013.01); *B29C 45/14639* (2013.01); *B29C 2045/14131* (2013.01); *B29K 2705/00* (2013.01); *B29K 2995/0005* (2013.01); *B29L 2031/3481* (2013.01)

(56) References Cited

U.S. PATENT DOCUMENTS

| | | | |
|---|---|---|---|
| 6,527,989 B1 * | 3/2003 | Onoda | B29C 45/14639 264/277 |
| 9,742,130 B2 * | 8/2017 | Glynn | B29C 45/14549 |
| 10,953,578 B2 * | 3/2021 | Fischer | B29C 45/14819 |
| 2004/0020975 A1 | 2/2004 | Smith et al. | |
| 2008/0044608 A1 | 2/2008 | Oeuvrard | |
| 2008/0187614 A1 | 8/2008 | Babin | |
| 2014/0352461 A1 | 12/2014 | Panis et al. | |
| 2015/0091206 A1 * | 4/2015 | Sato | B29C 45/14426 425/111 |
| 2015/0104638 A1 * | 4/2015 | Jeltsch | B29C 45/14467 428/221 |
| 2016/0221295 A1 | 8/2016 | Roychoudhury | |
| 2016/0230373 A1 | 8/2016 | Sliger et al. | |

FOREIGN PATENT DOCUMENTS

| | | | | |
|---|---|---|---|---|
| CN | 103660140 A | | 3/2014 | |
| CN | 106948988 A | | 7/2017 | |
| DE | 20203315 U1 | | 7/2003 | |
| DE | 102016101207 A1 | | 8/2016 | |
| EP | 600812 A1 | * | 6/1994 | .............. A47J 43/10 |
| GB | 1174479 A | * | 12/1969 | ......... F02M 51/0614 |
| JP | H11132127 A | | 5/1999 | |
| JP | 2001272109 A | | 10/2001 | |
| JP | 2002276505 A | | 9/2002 | |
| JP | 2002310032 A | | 10/2002 | |
| JP | 2005007872 A | * | 1/2005 | ....... B29C 45/14065 |
| JP | 2005007872 A | | 1/2005 | |
| JP | 2005036696 A | | 2/2005 | |
| JP | 2006142729 A | | 6/2006 | |
| JP | 2007136868 A | | 6/2007 | |
| JP | 2014222628 A | | 11/2014 | |
| KR | 101283509 B1 | | 7/2013 | |
| WO | 0155585 A1 | | 8/2001 | |

* cited by examiner

MOUNTING ELEMENT, MOUNTING SET, METHOD FOR MOUNTING, AND COMPONENT

FIELD

The present invention relates to a mounting element, a mounting set, a method for mounting, and a component. The present invention relates in particular to a mounting element, a mounting set and a method for mounting a terminal element to a component housing of a component body by extrusion-coating the component body at least in part with a coating material, and to a component which is formed using the mounting element, the mounting set and/or the method for mounting.

BACKGROUND INFORMATION

In the industrial manufacture of components, frequently multiple component parts have to be connected to one another and then have to be jointly enclosed by an embedding coating material. For this purpose, mounting elements are used which hold two component parts together and position them relative to one another, whereby the positioning is to be maintained during the coating. In the case of many valves, for example, it is necessary to electrically contact electrical terminals of a base body of the valve using a plug and then to embed in the coating material at least a portion of the base body and its housing, as well as the electrical terminals and the contacting plug. For contacting the plug, i.e., for the pre-mounting, mounting clips are used as mounting elements for holding and positioning, which carry the plug to be contacted and are attached to the housing of the base body of the valve by a force fit and/or a form fit for pre-mounting. During the coating, the mounting clip is embedded as a lost element in the coating material.

Traditionally, existing mounting elements are unable in any event to maintain the initially selected positioning between the component parts during the coating process, whereby a relatively large degree of production variances occur.

SUMMARY

An example mounting element according to the present invention may have the advantage over the related art that the initially selected position between component parts that are held to one another may be maintained even during a coating process, whereby a higher degree of reliability during production occurs. According to the present invention, this is achieved by an example mounting element, and in particular a retaining element or a clip, provided for mounting a terminal element at a component housing of a component body by extrusion-coating the component body at least in part with a coating material, which is designed (i) for holding and positioning a terminal element at a component housing of a component body while the component body is being coated at least in part with a coating material, and (ii) to be accommodated at least in part in the interior of a molding tool during the coating. The mounting element according to the present invention includes at least two support elements which are designed in such a way that they are supported on an inner surface of the molding tool when the mounting element is held at the component housing of the component body while the component body and the mounting element are accommodated in the interior of the molding tool.

Preferred refinements of the present invention are described herein.

Generally, all geometries which ensure the support function are possible for the design of the support elements. However, geometries are preferred which do not adversely affect the handling of the mounting element. For example, the support elements should not make it more difficult, or should not make it significantly more difficult, to attach the mounting element at the component body and in particular at the component housing. When using a clip, for example, this means that the force that has to be overcome in order to attach the clip should be increased at most very little by providing the support elements.

In the example mounting element according to the present invention, a particularly simple and suitable structure is obtained if, according to one preferred refinement, a respective support element is designed as a support knob.

A respective knob may for example be designed essentially in the shape of a cylinder, a cone or a truncated cone, a pyramid or a truncated pyramid, a prism or a truncated prism, a sphere or a portion of a sphere, an ellipsoid or a portion of an ellipsoid.

In another advantageous refinement, the number and/or the mutual geometric arrangement and/or orientation are alternatively or additionally designed relative to one another and/or relative to the geometry of an underlying body of the mounting element and/or of an underlying molding tool.

The number, the positioning and/or the orientation of the support elements may be selected in such a way that the latter are supported for example counter to the direction of flow of the coating material during the coating.

In one preferred specific embodiment of the mounting element according to the present invention, a plurality of support elements are formed in pairs at the mounting element.

As an alternative or in addition, elements of a respective pair of support elements may be attached to the mounting element essentially opposite one another—in particular diametrically opposite one another—with respect to the mounting element, in particular with respect to a center of gravity, an axis of the figure, an axis of symmetry and/or a plane of symmetry of the mounting element, in order to form a pair made up of a bearing and a counter-bearing when supported on the inner surface while accommodated in the interior of a molding tool.

In another advantageous additional or alternative refinement of the mounting element according to the present invention, this is designed in the form of a one-material piece.

In addition or as an alternative, the mounting element according to the present invention may be designed with a flexible and/or pretensioned clip area, which is configured to encompass an area of a component housing in a spring-pretensioned, form-fitting and/or force-fitting manner with bearings and counter-bearings for holding and positioning at the component housing.

In another advantageous embodiment, the mounting element according to the present invention is designed with a connecting element for accommodating and holding the terminal element, and/or with or made of a material that differs from a provided coating material for the coating to be formed.

Furthermore, the present invention also relates to a mounting set for mounting a terminal element at a component housing of a component body by extrusion-coating the component body at least in part with a coating material.

The mounting set according to the present invention includes a mounting element of the type according to the present invention and also a molding tool, it being possible for the latter to be configured in the manner of an injection mold or casting mold.

In the mounting set according to the present invention, the molding tool is configured to accommodate the mounting element, which holds and positions a terminal element, in its interior in such a way that, in the accommodated state, support elements of the mounting element are supported on an inner surface of the molding tool, in particular in the manner of bearings and counter-bearings.

In one advantageous specific embodiment of the mounting set according to the present invention, it includes a coating material in liquid or past-like form, which is different, in particular, from a material underlying the mounting element, in particular in terms of its composition.

According to another aspect of the present invention, a method for mounting a terminal element at a component body or at a component housing of a component body is also provided.

In the provided example method for mounting a terminal element, at least one mounting element according to the present invention is used and in particular the mounting set according to the present invention, the terminal element being held and positioned at a component body or at a component housing of a component body with the aid of the mounting element.

According to one refinement of the example method according to the invention, in the held state, the mounting element holding and positioning the terminal element is accommodated, together with at least a portion of the component body or of the component housing of the component body, in the interior of a molding tool and in particular of the molding tool of the mounting set in such a way that support elements are supported on an inner surface of the molding tool.

In another advantageous embodiment of the method according to the present invention, in a state in which the mounting element holding and positioning the terminal element is accommodated in the interior of the molding tool and in which support elements of the mounting element are supported on an inner surface of the molding tool, a coating material and in particular the coating material of the mounting set is filled into the molding tool and in particular is cured.

Thereafter, the molding tool is preferably then removed to expose the mounting element in order to finish the component including component body, terminal element, and mounting element.

According to another preferred refinement of the method according to the present invention, a valve, a fuel injector or a high-pressure valve or a base body of a valve, a fuel injector or a high-pressure valve is used as the component body.

In addition or as an alternative, a plug element or a flat plug made of an electrically conductive material and in particular of metal may be used as the terminal element in the method according to the present invention, and in particular, prior to a coating, the plug element as the terminal element is electrically connected to a power supply and/or control connections of the valve or base body of the valve, for example by welding or soldering.

In preferred embodiments of the method according to the present invention for mounting, a valve, a fuel injector or a high-pressure valve is thus produced.

Finally, another aspect of the present invention is to provide a component, in particular an electrical component, a valve, a high-pressure valve or a fuel injector.

The component according to the present invention has a coating, in which a mounting element according to the present invention is embedded at least in part.

In particular, the component according to the present invention is produced on the basis of a specific embodiment of the method according to the present invention for mounting.

BRIEF DESCRIPTION OF THE DRAWINGS

Specific embodiments of the present invention are described in detail below with reference to the figures.

DETAILED DESCRIPTION OF EXAMPLE EMBODIMENTS

Figure 1:
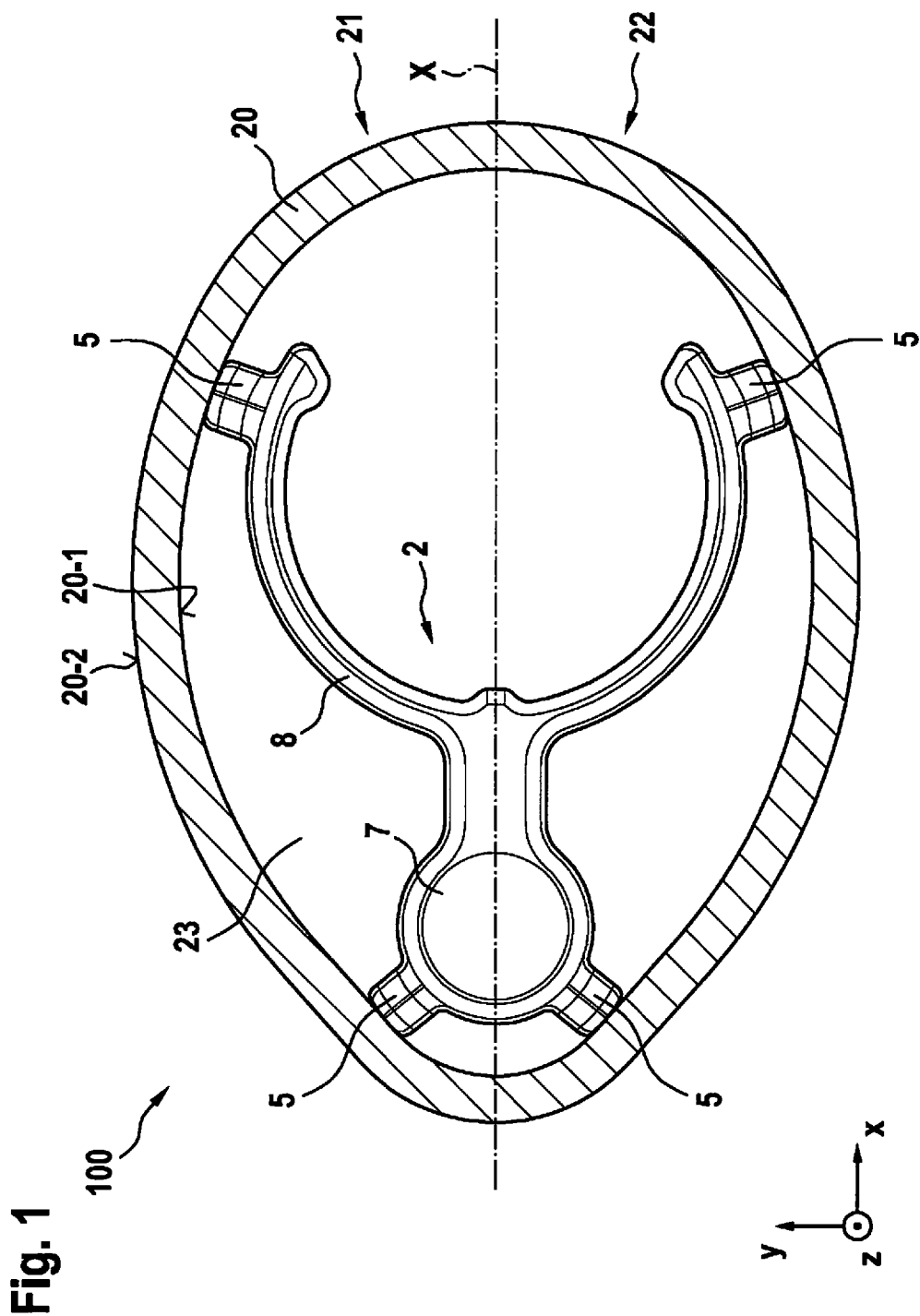
FIG. 1 shows, in a sectional top view, a specific embodiment of the mounting set according to the present invention including a mounting element according to the present invention in the interior of a molding tool.

Exemplary embodiments of the present invention and the technical background will be described in detail below with reference to FIGS. 1 through 7. Elements and components which are identical and equivalent and which have an identical or equivalent function will be denoted by the same reference numerals. The designated elements and components will not be described in detail every time they appear.

The illustrated features and further properties may be isolated from one another in arbitrary form and may be arbitrarily combined with one another, without departing from the core of the present invention.

Prior to discussing the present invention in detail, a conventional mounting set 100' and in particular a conventional mounting element 2' in a molding tool 20 should initially be explained with reference to FIG. 7.

Figure 7:
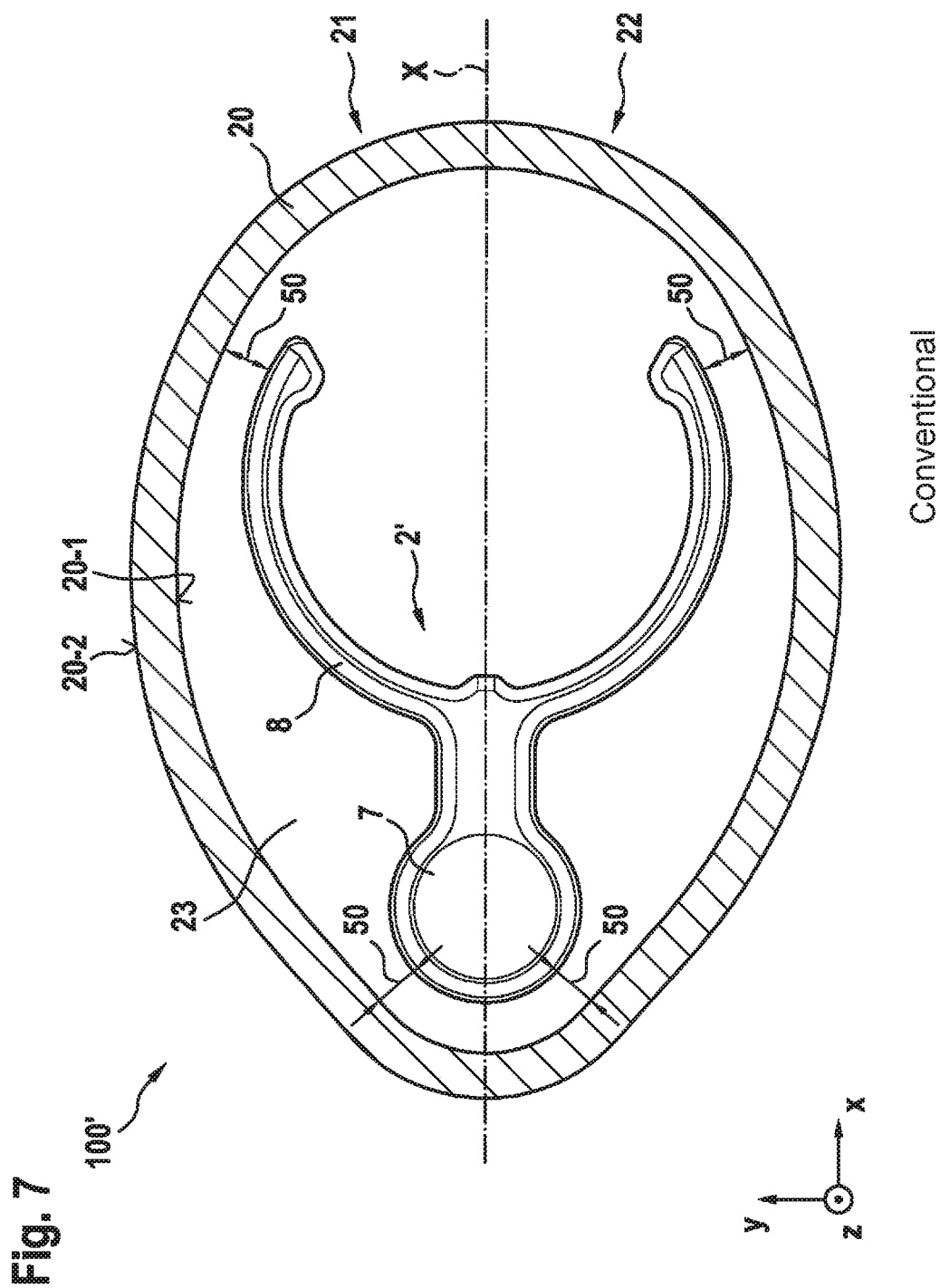
FIG. 7 shows, analogous to FIG. 1, a conventional mounting element in a molding tool.

FIG. 7 thus shows, in a sectional top view, a conventional mounting set 100'. This is made up of a molding tool 20, including a first mold part 21 and a second mold part 22 which, in the jointed arrangement shown in FIG. 7, form a closed injection mold including an interior 23.

In the situation shown in FIG. 7, a conventional mounting element 2', which may also be referred to as a clip, is shown in interior 23 of molding tool 20. In section, the conventional mounting element is mirror-symmetrical in relation to axis X, i.e., mounting element 2' as a whole is constructed mirror-symmetrically in relation to a plane which is perpendicular to the plane of the drawing and which contains axis X.

Conventional mounting element 2' according to the specific embodiment of FIG. 7 includes a clip area 8, by which conventional mounting element 2' may be attached at a base body of a component (not shown here), namely with the aid of a form fit and/or a force fit.

In order to accommodate a component that is to be pre-mounted, for example a terminal element, a plug or the like, conventional mounting element 2' includes connecting element 7 which may also be referred to as a connecting piece and which is configured to hold the component that is to be pre-mounted.

First and second mold part 21, 22 of molding tool 20 may also be separated from one another along this plane of symmetry.

The situation shown in FIG. 7 illustrates that, although conventional mounting element 2' is fully contained in interior 23 of molding tool 20, it is actually spaced entirely apart from inner surface 20-1 of first and second mold parts 21 and 22. This means that a gap 50 is formed between inner surface 20-1 and conventional mounting element 2' including clip area 8 and connecting element 7.

It may be seen from the arrangement shown in FIG. 7 that, during the coating process, the coating material flows around the entirety of conventional mounting element 2' during operation. At a relevant toughness and/or at a relevant pressure, the forces exerted on conventional mounting element 2' may not be compensated for by relevant counter-bearings, so that, if the forces are of relevant strength, pre-mounted conventional mounting element 2' together with the held components to be pre-mounted may be displaced in terms of position and/or orientation.

This traditionally results in a loss of quality during production.

This problem is avoided according to the present invention by providing relevant support elements 5 on mounting element 2 according to the present invention and in particular by arranging these on its outer circumference.

In comparison to FIG. 7, FIG. 1 shows, in a sectional top view, a specific embodiment of mounting set 100 according to the present invention including a mounting element 2 according to the present invention arranged in interior 23 of a molding tool 20.

In contrast to the arrangement shown in FIG. 7, it is clearly apparent that clip area 8 and connecting element 7 are each designed with a pair of support elements 5 in the form of knobs. A respective knob has an essentially circular-cylindrical shape here. However, this shape is not mandatory.

It is clearly apparent that a respective knob as a support element 5 is supported against a respective mold part 21, 22 from interior 23 on inner surface 20-1, which may also be referred to as the inner surface. When coating material 1' is supplied in order to form a coating 1, relevant forces which are exerted on mounting element 2 as the coating material flows around mounting element 2 according to the present invention are absorbed and compensated for as a result of being supported on inner surface 20-1. This prevents the forces from changing the position and/or the orientation of mounting element 2, which is pre-mounted at a component body 11.

According to the present invention, therefore, mounting element 2 remains at the predetermined position and in the predetermined orientation during the coating process, so that terminal element 4 held by mounting element 2 also remains fixed in the preselected position and orientation.

Figure 2:
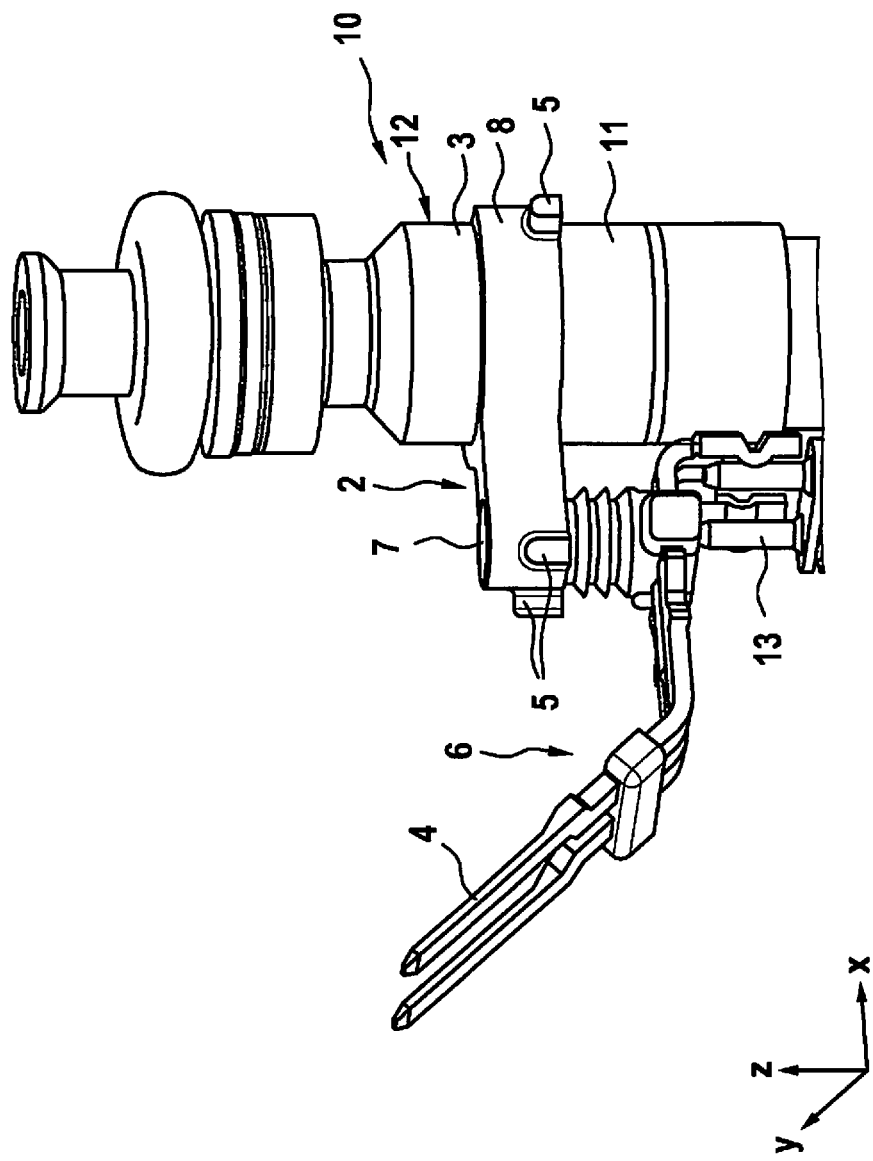
FIGS. 2 and 3 show, in a perspective side view, a specific embodiment of the mounting element according to the present invention, which is pre-mounted at a component housing and holds a terminal element, namely prior to and after coating with a coating material.
Figure 3:
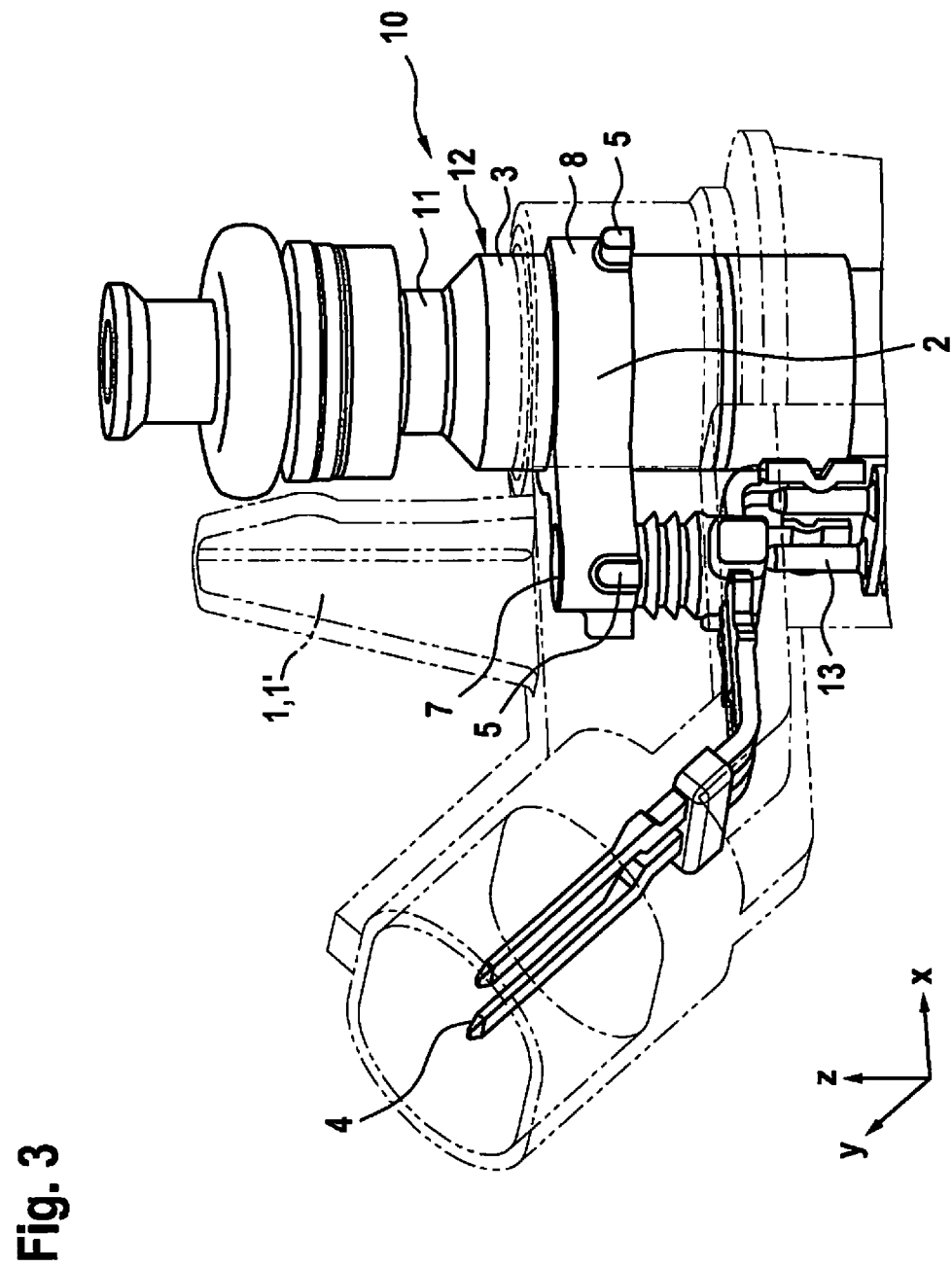

FIGS. 2 and 3 show, in a perspective side view, a specific embodiment of mounting element 2 according to the present invention which is pre-mounted at a component housing 3 via clip area 8 and holds a terminal element 4 via connecting element 7, namely prior to and after the formation of coating 1 with a coating material 1'.

Figure 4:
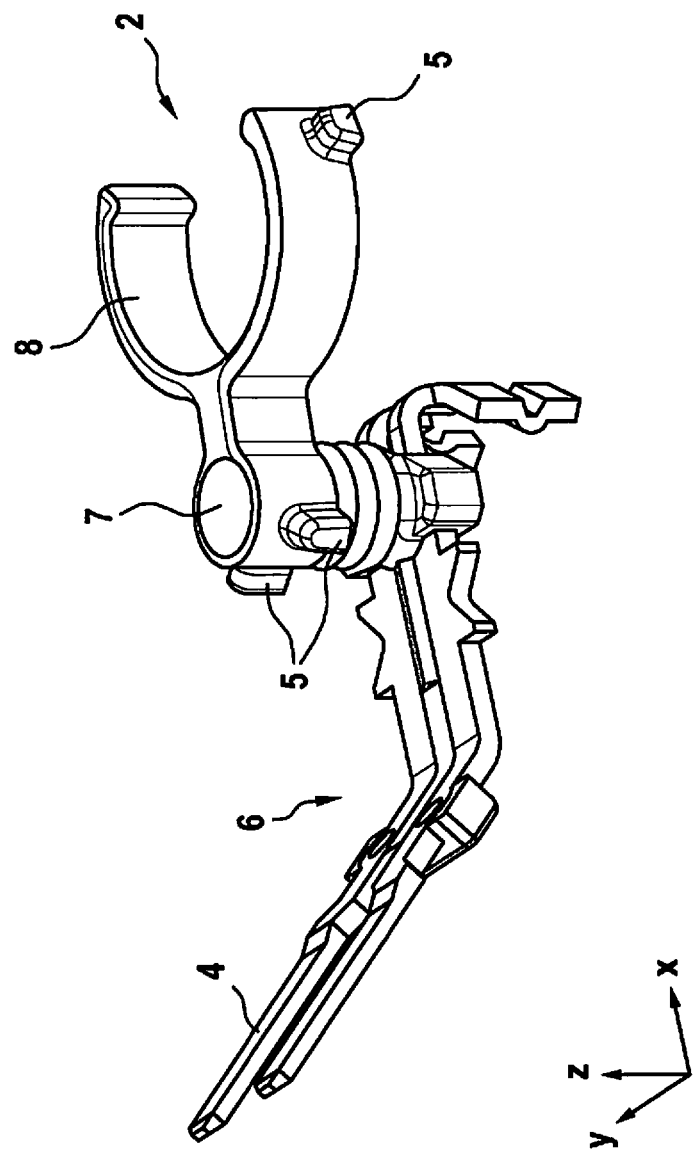
FIGS. 4 through 6 show, in different views, a specific embodiment of the mounting element according to the present invention, which holds a terminal element for pre-mounting.
Figure 5:
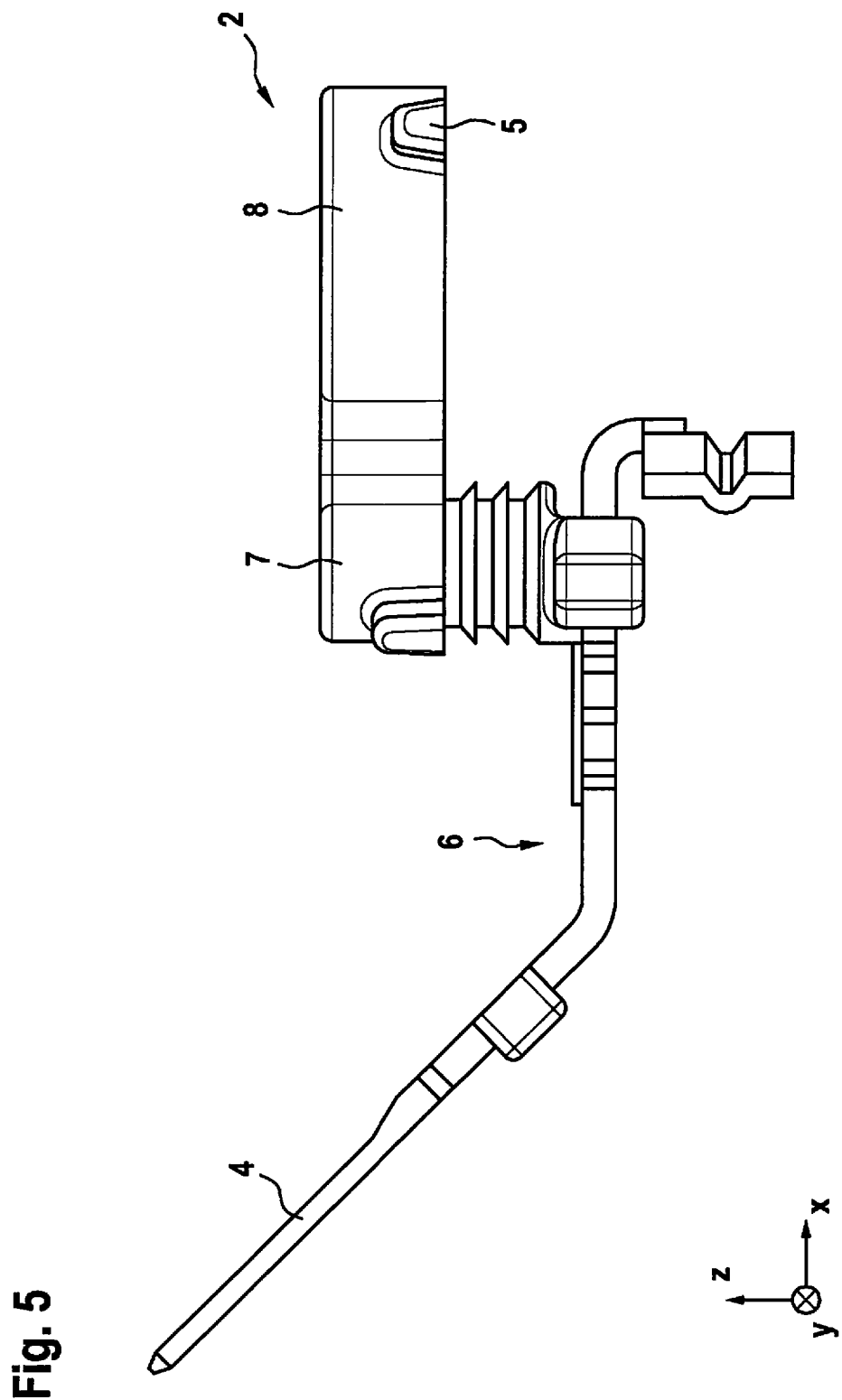
Figure 6:
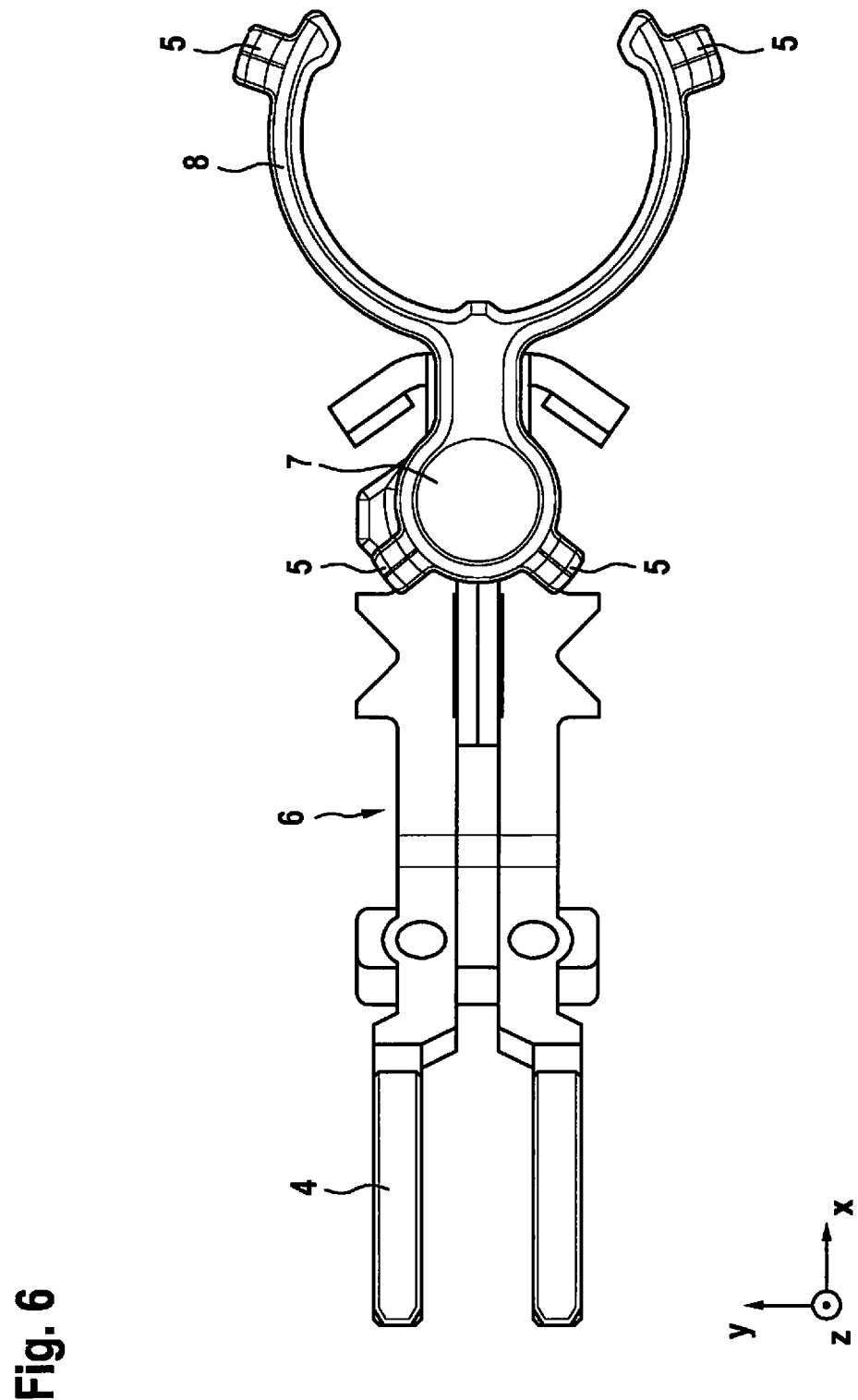

FIGS. 4 through 6 show, in different views, a specific embodiment of mounting element 2 according to the present invention which, in order to be pre-mounted at housing element 3 of a component 10 with the aid of a clip area 8, holds a terminal element 4 via a connecting element 7 for pre-mounting.

These and other features and properties of the present invention will be further explained on the basis of the following explanations:

In the case of a fuel injector as component 10, flat plug 4 is clipped onto the connection sleeve as housing element 3 by a retaining clip as mounting element 2 during the mounting process, and then is pushed to the intended position. Thereafter, flat plug 4 is connected to contacts 13 of the magnetic coil. In this case, the electrical conductors are connected by resistance welding.

A clip 2, 2' is required since simultaneous pre-mounting and welding cannot be carried out in one operation.

When forming coating 1 of fuel injector 10, a conventional clip 2'—as shown in FIG. 7—is deformed or displaced by coating material 1' in such a way that conventional clip 2' is aggraded to the wall of coating 1 and is visible on the surface of the coating. Due to the deformation and displacement of the position of conventional clip 2', current-carrying flat plugs 4 connected to conventional clip 2' are also displaced and thus may also be aggraded to the surface of coating 1.

It is an object of the present invention to avoid the floating of conventional clip 2' and the resulting displacement of current-carrying flat plugs 4 using preferably simple and inexpensive means.

Reinforcing conventional clip 2' in order to prevent the deformation would have the result of increasing the clipping force that has to be overcome.

Another possibility would be to change the incoming flow or other adjustable parameters of the machine when forming coating 1. However, this is not possible in many cases for technical or cost reasons.

The support knobs provided as support elements 5 according to the present invention may be inexpensively produced directly during manufacture of clip 2 according to the present invention. No additional parts or work processes are necessary.

FIG. 3 shows, inter alia, a high-pressure fuel injector as component 10 according to the present invention including coating 1—shown here in a semi-transparent manner—made of a coating material 1' and clip 2 according to the present invention which is clipped onto connecting sleeve 3 of housing 12 of component body 11. Clip 2 according to the present invention is permanently connected to flat plug 4.

In the case described, clip 2 according to the present invention is positioned in molding tool 20 by four support knobs 5 in such a way that clip 2 and flat plug 4 connected thereto may not be displaced as the coating is being formed.

Support knobs 5 are positioned in such a way that they are supported on tool inner wall 20-1 during the coating in tool 20. The position may be selected in such a way that they are supported counter to the direction of flow of the injected mass of coating material 1'.

FIGS. 4 through 6 show, inter alia, a state in which flat plug module 6 is attached prior to being mounted on connecting sleeve 3 according to FIG. 3.

In the case described, four support knobs 5 are symmetrically attached at clip 2 according to the present invention and at connection element 7 to flat plug 4.

According to the present invention, more or fewer support knobs 5 may also be attached.

The shapes of the support knobs may also be suitably selected depending on the type of support and conditions.

What is claimed is:

1. A mounting set comprising:
a mounting element pre-mounted to an electrical terminal element via a connecting element thereof and to a component housing of a component body via a clip area thereof while the component body is being encapsulated at least in part with a coating material, the clip area and connecting element being laterally disposed at opposing ends of the mounting element and each being provided with a pair of support elements extending radially outward therefrom, whereby the connecting element defines an opening for holding the terminal element, the clip area is structured to accommodate the component housing via spring-tension, form-fit, and/or force fit, and the support elements take the form of support knobs, and whereby the mounting element is configured to be accommodated at least in part in an interior of a molding tool during the coating such that the support elements are supported against an inner cavity surface of the molding tool so as to remain in a fixed position and orientation during the coating; and
the molding tool, the molding cavity being defined such that the coating is formed around the mounting element and at least in part around the component housing and the terminal element.

2. The mounting element as recited in claim 1, wherein the mounting element is a retaining element or clip.

3. The mounting element as recited in claim 1, wherein support elements of respective pairs of the support elements are arranged opposite one another with respect to the mounting element in relation to a center of gravity, an axis of symmetry, and/or a plane of symmetry of the mounting element.

4. The mounting element as recited in claim 1, wherein the respective pairs of the support elements are arranged on the mounting element diametrically opposite one another.

5. The mounting element as recited in claim 1, wherein the mounting element is formed as a one-material piece, whereby: (i) the clip area is a flexible and/or pre-tensioned clip area which is configured to encompass an area of the component housing in a spring-pretensioned, form-fitting, and/or force-fitting manner, and/or (ii) the connecting element is configured to accommodate and hold the terminal element, and/or (iii) the mounting element is made of a material that differs from the coating material.

6. The mounting set as recited in claim 1, wherein the support elements of the mounting element are supported at the inner surface of the molding tool in the manner of bearings and counter-bearings.

7. The mounting set as recited in claim 1, further comprising:
the coating material in liquid or paste-like form, which is different from a material underlying the mounting element.

8. The mounting set as recited in claim 1, wherein the component body is an electrical component, a valve, or a fuel injector.

9. The mounting set of claim 8, wherein the component body is the valve, and the valve is a high pressure valve.

10. The mounting set of claim 1, wherein the terminal element is a flat plug element.

11. A method comprising:
providing the mounting set of claim 1; and
holding and positioning the terminal element and the component housing of the component body via said pre-mounting to the mounting element.

12. The method as recited in claim 11, wherein, in the held state, the mounting element which holds and positions the terminal element is accommodated, together with at least a portion of the component housing of the component body, in the interior of the molding tool in such a way that the support elements are supported on the inner surface of the molding tool.

13. The method as recited in claim 12, wherein, in a state in which the mounting element which holds and positions the terminal element is accommodated in the interior of the molding tool and in which the support elements of the mounting element are supported on the inner surface of the molding tool, the coating material is filled into the molding tool and is cured, and after the filling and curing, the molding tool is removed.

14. The method as recited in claim 12, wherein: (i) the component body is a valve, a fuel injector, or a base body of a valve of a fuel injector, and/or (ii) the terminal element is a plug element made of an electrically conductive material, and, prior to said coating, the plug element is electrically connected to a power supply and/or control connections by welding or soldering.

* * * * *